(12) United States Patent
Larson

(10) Patent No.: US 6,292,807 B1
(45) Date of Patent: *Sep. 18, 2001

(54) METHOD FOR CONTROLLING PIPELINED MEMORY ACCESS REQUESTS

(75) Inventor: Douglas Alan Larson, Lakeville, MN (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 09/212,047

(22) Filed: Dec. 15, 1998

(51) Int. Cl.$^7$ ............................................. G06F 17/30
(52) U.S. Cl. ........................ 707/201; 710/39; 711/150; 711/169
(58) Field of Search .................................. 707/200–204; 345/501–506, 520, 521; 710/6, 7, 21–28, 39–45, 52–57; 711/147–151, 167–169, 140, 141

(56) References Cited

U.S. PATENT DOCUMENTS

| | | | |
|---|---|---|---|
| 4,811,203 | * 3/1989 | Hamstra | 711/142 |
| 5,911,051 | * 6/1999 | Carson et al. | 710/107 |
| 5,948,081 | * 9/1999 | Foster | 710/40 |
| 5,987,555 | * 11/1999 | Alzien et al. | 710/129 |
| 5,990,913 | * 11/1999 | Harriman et al. | 345/521 |
| 6,047,334 | * 4/2000 | Langendorf et al. | 710/5 |
| 6,070,215 | * 5/2000 | Deschepper et al. | 710/129 |
| 6,088,772 | * 7/2000 | Harriman et al. | 711/158 |
| 6,092,158 | * 7/2000 | Harriman et al. | 711/151 |
| 6,157,977 | * 12/2000 | Sherlock et al. | 710/129 |

* cited by examiner

*Primary Examiner*—Maria N. Von Buhr
(74) *Attorney, Agent, or Firm*—Dorsey & Whitney LLP

(57) ABSTRACT

A method is described for controlling pipelined memory access requests in an AGP-compliant computer system. Memory access requests are stored in separate write and read request queues. To control the ordering of the write and read requests relative to one another, each of the requests has an associated age tag assigned to it. In the event a read request is received, an age tag value is assigned to it that corresponds with the number of previously received and currently pending write requests. Similarly, when a write request is received, an age tag value is assigned that corresponds with the number of previously received and currently pending read requests. Employing such age tags provides AGP-compliant ordering of the write and read requests, while also providing write-passing-read capability without the attendant complex logic circuitry and time delays associated with conventional AGP implementations.

27 Claims, 11 Drawing Sheets

METHOD FOR CONTROLLING PIPELINED MEMORY ACCESS REQUESTS

TECHNICAL FIELD

The present invention relates generally to protocols associated with servicing memory access requests in a computer system, and more particularly, to methods for controlling service of pipelined memory access requests.

BACKGROUND OF THE INVENTION

In recent years, the memory requirements for personal computers have greatly increased, including both requirements for increased memory capacity and improved memory access speed. One major reason for the increased memory requirements is the desire of computer users to view graphical images, including three-dimensional graphical images, with high accuracy and detail. Displaying such graphical images requires large amounts of memory to store the graphical data, while regularly updating these images requires high access speeds to that data.

One way of providing improved access speeds is to pipeline memory access requests. A relatively new bus architecture and protocol, known as Accelerated Graphics Port (AGP), has been developed to provide improved memory access speeds between a graphics controller and system memory in a computer system (see Accelerated Graphics Port Interface Specification, Revision 1.0, Intel Corporation, Jul. 31, 1996). FIG. 1 is a functional block diagram that highlights certain portions of a prior art computer system 200 that includes a pipelined memory access architecture such as AGP. A graphics controller 202 is coupled with a system memory 204 via AGP interface circuitry 206 and a memory controller 208. The graphics controller 202 is coupled with a video monitor 210 and controls how graphical images are displayed on the video monitor.

The graphics controller 202 is also coupled with a local frame buffer 212. A portion of the graphics data used to produce graphical images is stored in the local frame buffer 212, while another portion of the graphics data is stored in the system memory 204. Typically, the graphics data stored in the system memory 204 includes texture maps that are models of surface textures that are shared by different images displayed on the video monitor 210. The local frame buffer 212 typically stores other graphics data, such as Z buffers that are used to create three-dimensional graphics images.

The speed at which the graphics controller 202 can display graphical images on the video monitor 210 is limited by the speed at which the graphics controller can access the graphics data from the system memory 204. The AGP interface circuitry 206 provides improved memory access speeds, largely by pipelining memory access requests, and thereby substantially hiding individual memory access times or latencies associated with non-pipelined memory access requests. The AGP interface circuitry 206 includes a request queue 214 that stores a plurality of memory access requests from the graphics controller 202 for subsequent service by the memory controller 208. Each memory access request includes information concerning the type of request (read or write), the address of the location to be accessed in system memory, and the requested data byte length. The AGP interface circuitry 206 also includes a write data queue 216 that stores data associated with write requests residing in the request queue 214. Similarly, the AGP interface circuitry 206 includes a read data return queue 218 that stores data retrieved by the memory controller 208 for subsequent return to the graphics controller 202.

The request queue 214 may include both high priority and low priority requests, which have separate priority and ordering rules. High priority requests are used very infrequently, such as when a request needs immediate processing. Low priority requests represent the large majority of memory access requests, and are the subject of the following discussion. For purposes of brevity, therefore, subsequent reference to read and write requests will be understood to encompass the low priority AGP read and write requests, as one example of ordered pipelined memory access requests.

Service of the pipelined read and write requests is performed in accordance with particular ordering rules dictated by the AGP specification. Read data is returned to the graphics controller 202 in the same order as requested. As a practical matter this rule of read data return is readily accomplished by the memory controller 208 accessing the system memory 204 in the order requested, although such need not be the case. All write requests are, in fact, processed by the memory controller 208 in the order requested by the graphics controller 202. Read data must be coherent with previously issued write requests ("reads push writes"). However, write operations may bypass previously requested read operations, which allows write operations to be combined to minimize the frequency of write operations to the system memory 204.

Allowing write operations to pass read operations means that the request queue 214 does not function strictly as a first-in-first-out (FIFO) buffer, and logic circuitry is then required to point to read and write requests within the request queue. Such logic circuitry can be rather complex and result in significant time delays for any but a relatively small size request queue 214. Thus, the conventional methods used to pipeline memory access requests do not take full advantage of the improved access bandwidth afforded, in principle, by request pipelining.

SUMMARY OF THE INVENTION

In accordance with the present invention, a method is provided for controlling pipelined memory read and write requests in a computer system. Read and write requests are received and stored in separate request queues. A read age tag is assigned to each of the read requests, and a write age tag is assigned to each of the write requests. The read and write age tags may be stored in separate age queues. The order of service of requests is determined by the associated age tags. For each received read request, the associated age tag corresponds to or is equal to the number of previously received and stored write requests. For each received write request, the associated age tag corresponds to or is equal to the number of previously received and stored read requests. When a read request is serviced, the write age tags associated with still pending write requests are selectively modified, such as by decrementing any non-zero write age tag values. When a write request is serviced, the read age tags associated with still pending read requests are selectively modified, such as by decrementing any non-zero read age tag values.

DETAILED DESCRIPTION OF THE INVENTION

The following describes a novel method for controlling pipelined memory access requests in a computer system. Certain details are set forth to provide a sufficient understanding of the present invention, such as particular bus architecture and protocol types. However, it will be clear to one skilled in the art, that the present invention may be practiced without these particular details. In other instances, well-known circuits, control signals, timing protocols, and software operations have not been shown in detail in order to avoid unnecessarily obscuring the invention.

Figure 1:
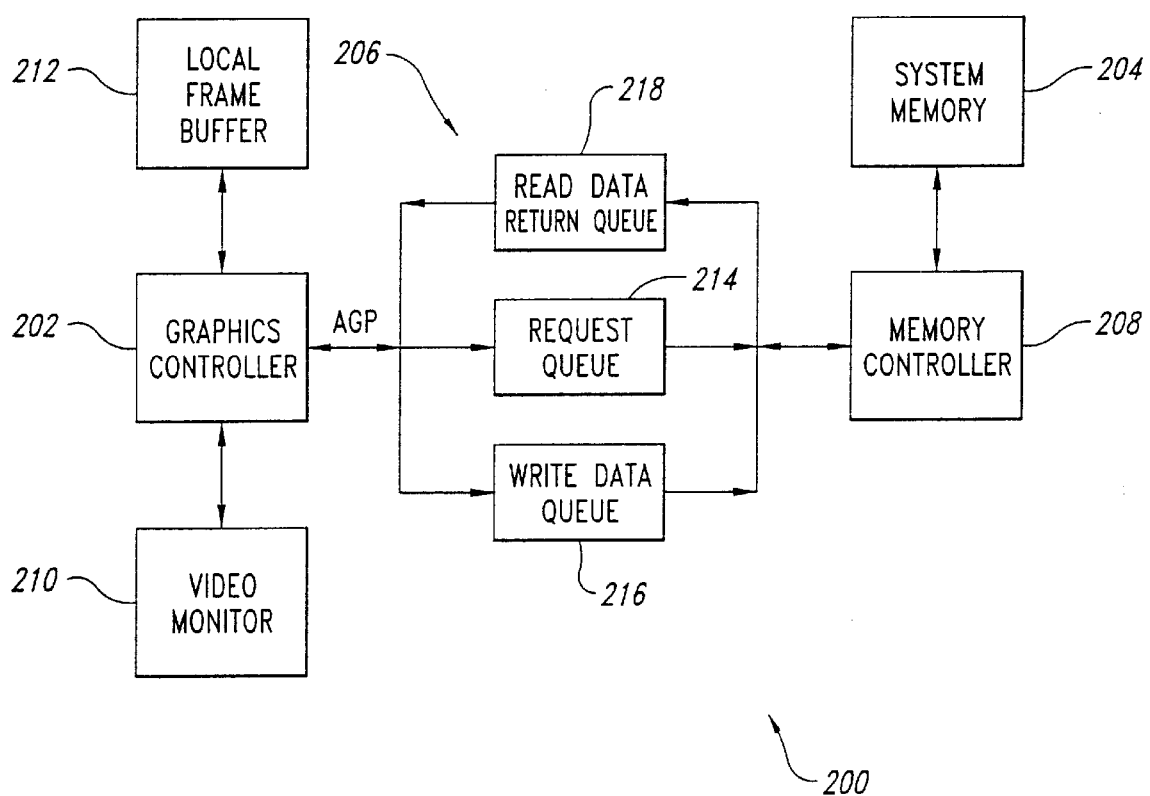
FIG. 1 is a functional block diagram depicting a portion of a prior art computer system.
Figure 2:
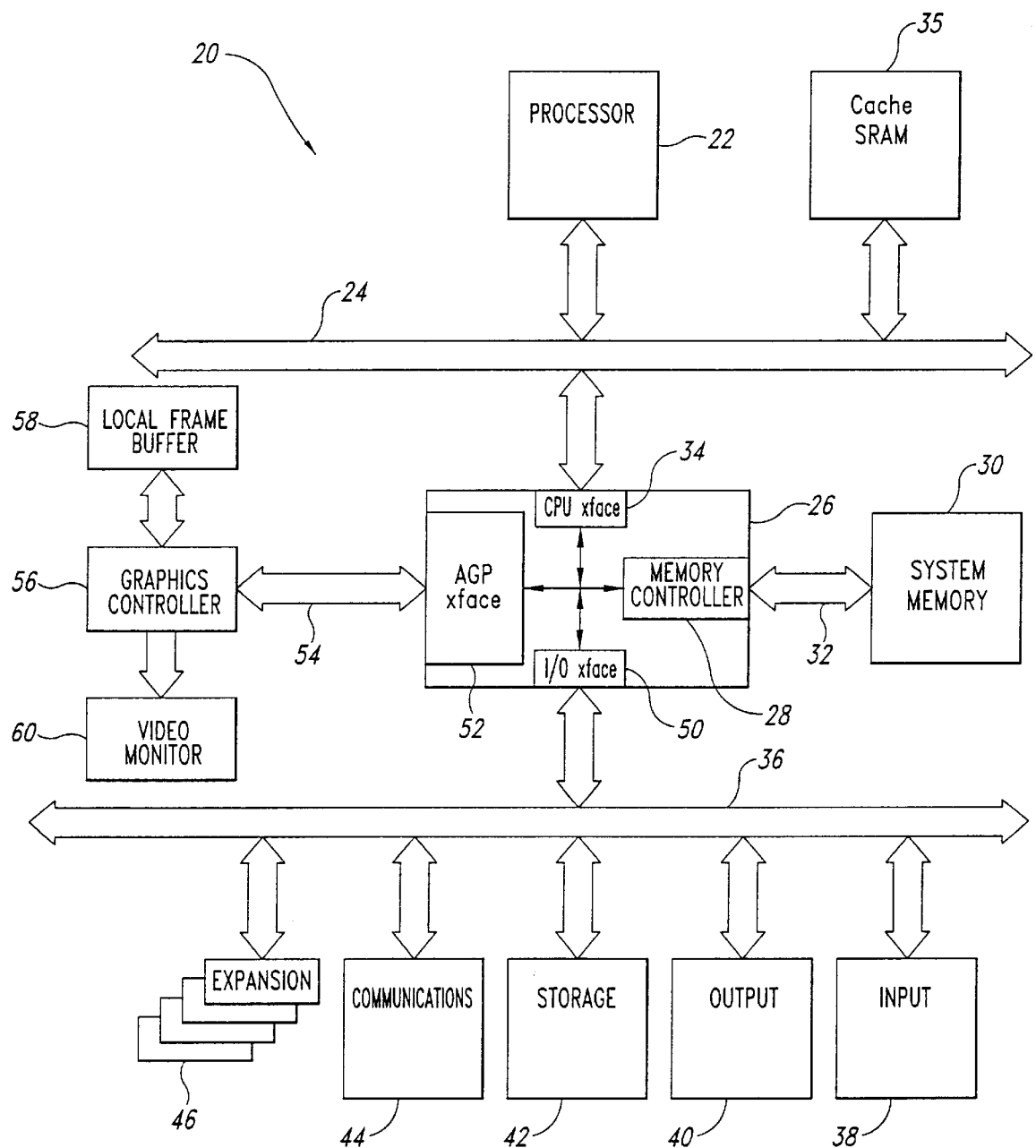
FIG. 2 is a functional block diagram depicting a computer system adapted to perform a method in accordance with an embodiment of the present invention.

FIG. 2 shows a computer system 20 that is adapted to perform a method in accordance with an embodiment of the present invention. A central processing unit (CPU), such as a microprocessor 22, is coupled with a system controller 26 (also known as corelogic) by a host or processor bus 24 that carries address, data, and control signals therebetween. The system controller 26 includes a memory controller 28 for accessing a system memory 30 via a memory bus 32. The system memory 30 may include any of a wide variety of suitable memory devices. Example memory devices include dynamic random access memory (DRAM) devices such as asynchronous DRAMs, synchronous DRAMS, SLDRAMs, RAMBUS DRAMs, etc. The system controller 26 includes CPU interface circuitry 34 that couples the microprocessor 22 with other components of the system controller, such as the memory controller 28. The system controller 26 may also include a cache controller (not shown) for controlling data transfer operations to a cache memory 35 that provides higher speed access to a subset of the information stored in the system memory 30.

The system controller 26 also functions as a bridge circuit (sometimes called the host bus bridge or North bridge) between the processor bus 24 and a system bus, such as I/O bus 36. The I/O bus 36 may itself be a combination of one or more bus systems with associated interface circuitry (e.g., PCI bus with connected SCSI and ISA bus systems). Multiple I/O devices 38–44 are coupled with the I/O bus 36. A data input device 38, such as a keyboard, a mouse, etc., is coupled with the I/O bus 36. A data output device 40, such as a printer, is coupled with the I/O bus 36. A data storage device 42, such as a disk drive, tape drive, CD-ROM drive, etc., is coupled with the I/O bus 36. A communications device 44, such as a modem, local area network (LAN) interface, etc., is coupled with the I/O bus 36. Additionally, expansion slots 46 are provided for future accommodation of other I/O devices not selected during the original design of the computer system 20.

FIG. 2 depicts the various I/O devices 38–44 as being coupled with the system controller 26 via a single shared I/O bus 36 and an I/O interface 50 integrated within the system controller. However, those skilled in the art will understand that one or more of the I/O devices 38–44 may have separately dedicated interface connections to the system controller 26, in which case the single depicted I/O interface 50 will be understood as a representation for a plurality of separately dedicated and adapted I/O interfaces. Alternatively, one or more of the I/O devices 38–44 may be coupled with the system controller 26 via a multiple bus and bridge network. As a further alternative, one or more of the I/O devices 38–44 may be coupled with a system controller 26 partly through a shared bus system and partly through separately dedicated signal line connections. Indeed, those skilled in the art will understood the depiction of FIG. 2 to encompass any of a wide variety of suitable interconnection structures between the memory 30, the memory controller 28, and the I/O devices 38–44.

For those devices requiring particularly high speed access to the system memory 30, the system controller 26 includes a pipelined memory access interface, such as an AGP bridge or interface 52. The AGP interface 52 is coupled via an AGP bus 54 to a graphics controller 56, which accesses data stored both in the system memory 30 and a local frame buffer 58 in order to control graphical images displayed on a video monitor 60. Those skilled in the art will understand that the AGP interface 52, the AGP bus 54, and associated graphics circuitry 56–60 represent one possible example of circuitry for pipelining data transfer requests to the system memory 30. The present invention is intended to encompass not only the particular circuits and protocols associated with AGP-compliant devices, but other devices in which pipelined memory access requests and associated interface and control circuits are required or desired.

Those skilled in the art understand that much information exchange in a computer system is time referenced to one or more clock signals. In particular, the graphics controller 56 will apply a memory access request that is registered in the AGP interface 52 at a time referenced to a system clock signal (not shown). Similarly, the AGP interface 52 will transfer memory access requests to the memory controller 28 at times referenced to the system clock signal. Depending upon the particular implementation, the AGP interface 52 may have the capability to both register a newly received memory access request and pass along a previously received memory access request at essentially the same time. Also, in certain implementations, both read and write memory access requests might be registered within the memory controller 28 at essentially the same time (made possible by the different timing of actual data transfer in memory write and read operations).

Figure 3:
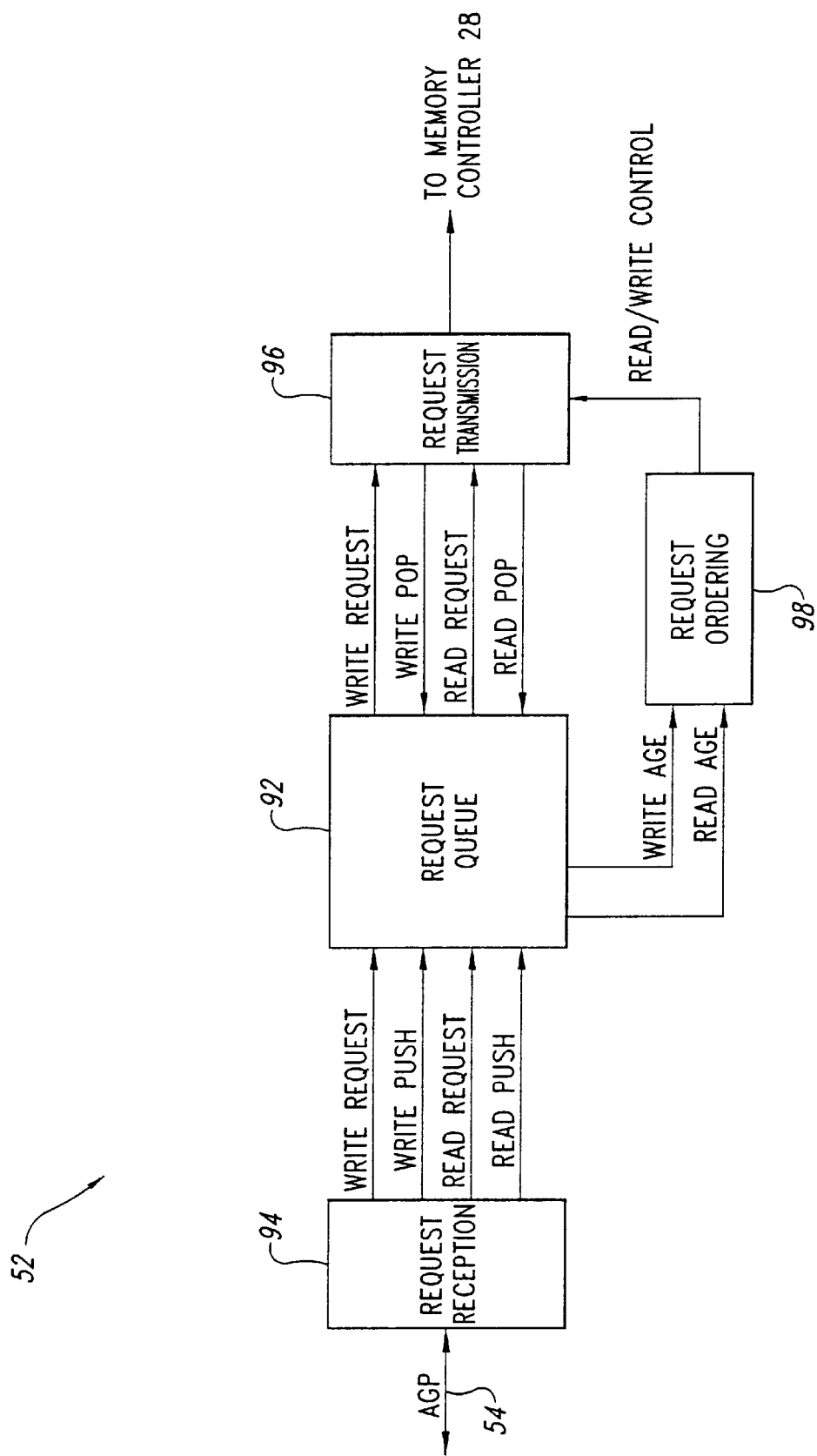
FIG. 3 is a functional block diagram depicting AGP interface circuitry included in the computer system of FIG. 2.

FIG. 3 shows certain details of the AGP interface 52. Request queue circuitry 92 is coupled with the AGP bus 54 and the memory controller 28 by request reception circuitry 94 and request transmission circuitry 96, respectively. As described in detail below, the request queue 92 provides separate read and write request queues. The request reception circuitry 94 receives the memory access request, determines whether it is a read or write request, and transmits the request along with a corresponding read or write push signal that controls loading of the request into the request queue 92.

As described in detail below, the request queue 92 produces read and write age signals that provide information about the ages of pending read and write requests stored in the request queue 92. Request ordering circuitry 98 receives the age signals and selectively applies one or more read/write control signals to control operation of the request transmission circuitry. The request transmission circuitry 96 is then enabled to receive the selected read or write request and produce a corresponding read or write pop signal to selectively shift entries stored in the request queue 92. The request transmission circuitry 96 translates the request into a form suitable for provision to the memory controller 28, as is well known to those skilled in the art. By sampling the age signals and correspondingly controlling operation of the request transmission circuitry 96, the request ordering circuitry 98 controls provision of requests to the memory controller 28 in a manner consistent with AGP request ordering rules.

Figure 4:
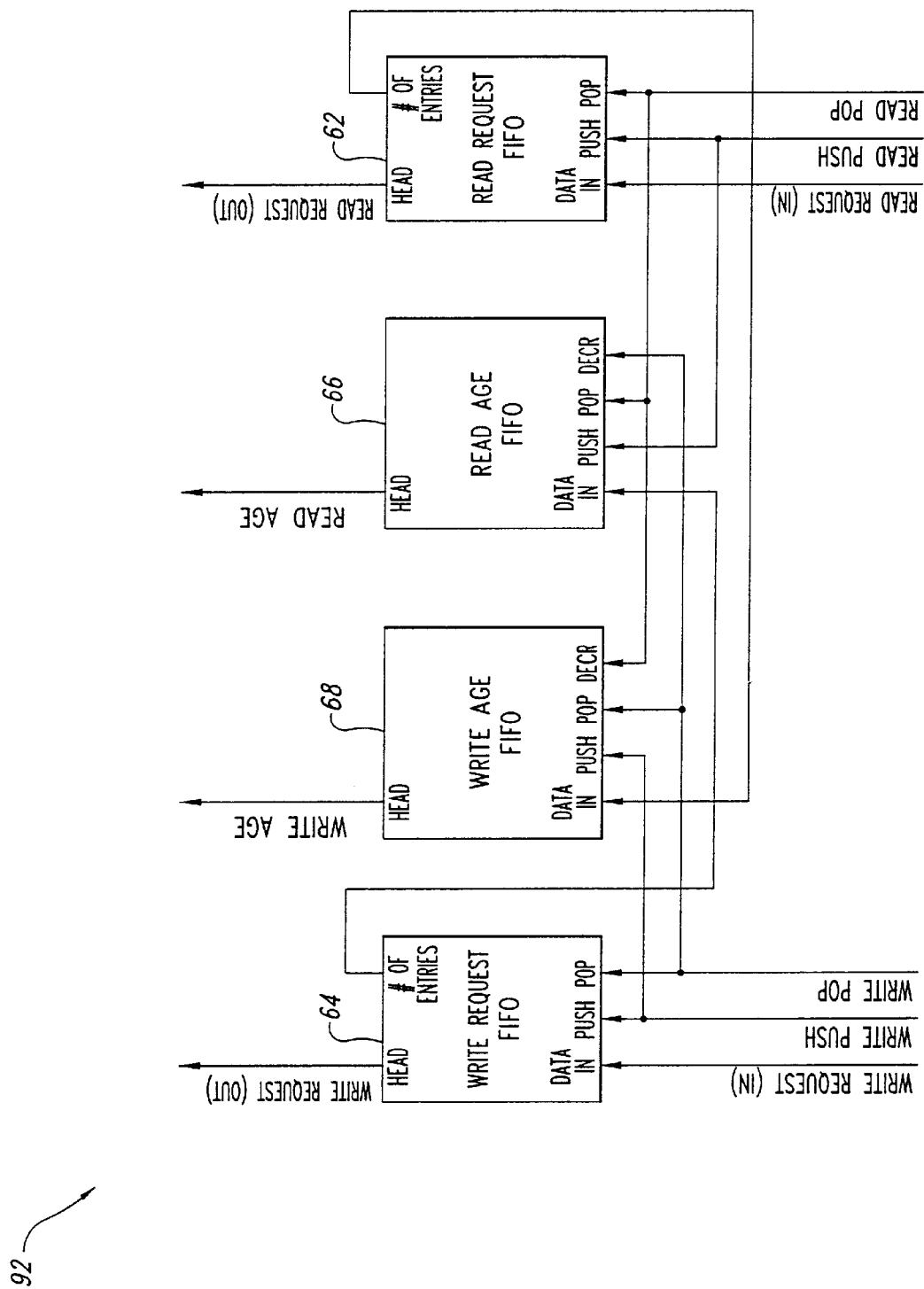
FIG. 4 is a functional block diagram depicting request queue circuitry included in the AGP interface circuitry of FIG. 3.

FIG. 4 depicts the request queue 92, in which pipelined read and write requests are stored in separate read and write request FIFOs 62 and 64, respectively. By separating read and write requests into separate FIFO pipelines, the potentially large and slow pointer logic circuitry required by the prior art is avoided. However, pipelining read and write requests in separate queues does destroy some of the inherent ordering provided by storing all requests in a single queue. In order to provide the order-of-service requirements of the write requests relative to the read requests, each of the requests has an associated age tag that is stored in a respective one of read and write age FIFOs 66 and 68, respectively.

The request FIFOs 62 and 64 are logically identical. Each of the request FIFOs 62, 64 includes a data input for receiving the request information, which is loaded in response to an asserted push signal applied to the FIFO. Each of the request FIFOs 62, 64 includes a data output or "head" that outputs the memory access request in response to an asserted pop signal applied to the FIFO. Each of the request FIFOs 62, 64 also produces an output signal whose value corresponds to the number of entries currently stored within the FIFO (i.e., the number of currently pending requests).

The age FIFOs 66 and 68 are logically identical, and include data input, data output, push, and pop terminals similar to those described in connection with the request FIFOs 62 and 64. While the terminology "push" and "pop" is most commonly used in connection with stacks, or last-in-first-out queues, those skilled in the art also use this terminology in connection with FIFOs to refer to inserting data (push) into the rear and removing data (pop) from the head of the FIFO queue. Each of the age FIFOs 66, 68 also includes a decrement control terminal to which a control signal is applied to selectively decrement each of the values stored in the age FIFO.

A write request is loaded into the write request FIFO 64 in response to an asserted write push signal. The same write push signal also loads data into the write age FIFO 68, with the data loaded therein being the number of entries currently stored in the read request FIFO 62. Similarly, an asserted read push signal loads a read request into the read request FIFO 62 along with the number of currently pending write entries into the read age FIFO 66.

A write request is removed from the head of the write request FIFO 64 in response to an asserted write pop signal, which also removes the corresponding write age tag from the write age FIFO 68. The write pop signal is also applied to the decrement input of the read age FIFO, resulting in the decrementing of each of the entries stored within the read age FIFO. Similarly, an asserted read pop signal removes read request information from the read FIFO 62, removes the corresponding read age tag from the read age FIFO 66, and decrements each of the values stored in the write age FIFO 68. Thus, each read age tag value corresponds to the number of previously received write requests that are pending, and each write age tag value corresponds to the number of previously received read requests that are pending.

FIGS. 5–9 depict a method of tracking and ordering memory access requests, which is illustrated with particular reference to the above-described FIFOs 66 and 68. Each of these figures includes a process flow depicting individual or combined push and pop operations, together with status diagrams depicting the contents of the age FIFOs 66 and 68. Each of the operations depicted in FIGS. 5–9 begins with the same initial state, in which the read age FIFO 66 includes three entries and the write age FIFO 68 includes three entries. The order in which the various memory access requests were received is indicated with a request number, which is not actually stored in the age FIFOs 66 and 68, but is included in the diagram for ease of understanding.

In the initial state shown in each of FIGS. 5–9, the first and second memory access requests are read requests. The associated age tag values are 0, because there were no previously received and pending requests in the write queue. The third and fourth received memory access requests are write requests. The associated age tag values are 2, because two previously received and currently pending read requests are stored in the read queue. The fifth received memory access request is a read request. Because two previously received and currently pending write requests are stored in the write queue, this read request is assigned a corresponding read age tag value of 2. The sixth received memory access request is a write request. Because three read requests were previously received and are currently pending, this write request is assigned an age tag value of 3.

Figure 5:
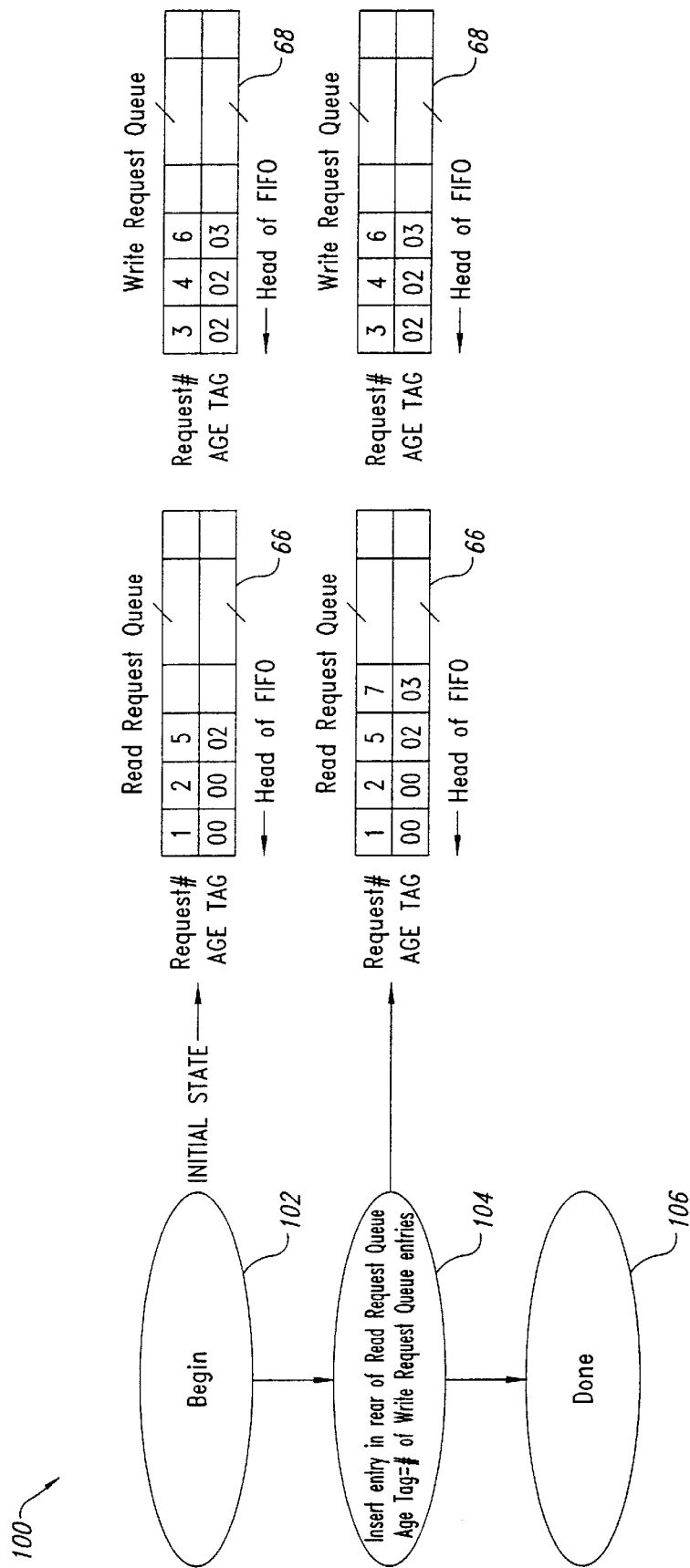
FIGS. 5–9 are part process flow, part status diagrams depicting a method of tracking and ordering memory access requests in accordance with an embodiment of the present invention.

Referring now to FIG. 5, an operation is shown in which a seventh memory access request is received. FIG. 5 depicts a read push operation 100, starting in step 102 with the initial state described above. In step 104, a read request is received and stored in the read request FIFO 62 (see FIG. 4), and an associated age tag is stored in the read age FIFO 66. When this read request is received, there exist three previously received and currently pending write requests, and the assigned read age tag value is correspondingly the number 3. The read push operation 100 is completed at step 106.

Figure 6:
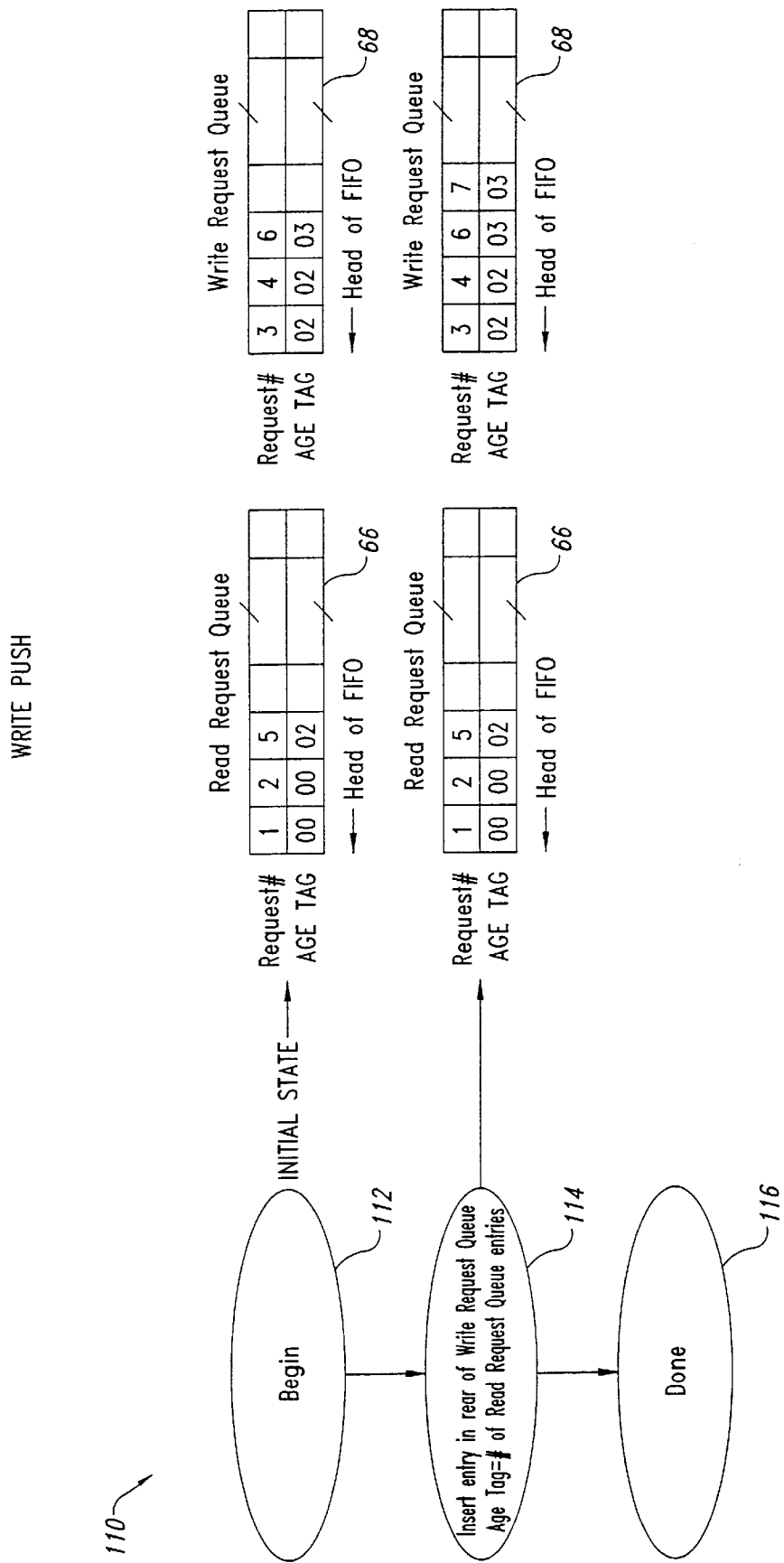

FIG. 6 depicts a write push operation 110, beginning in step 112 with the above-described initial state. Upon receipt of the write request in step 114, it is determined that three read requests were previously received and currently pending, and hence the write request is assigned an age tag value of 3. The write push operation 110 is completed at step 116.

Figure 7:
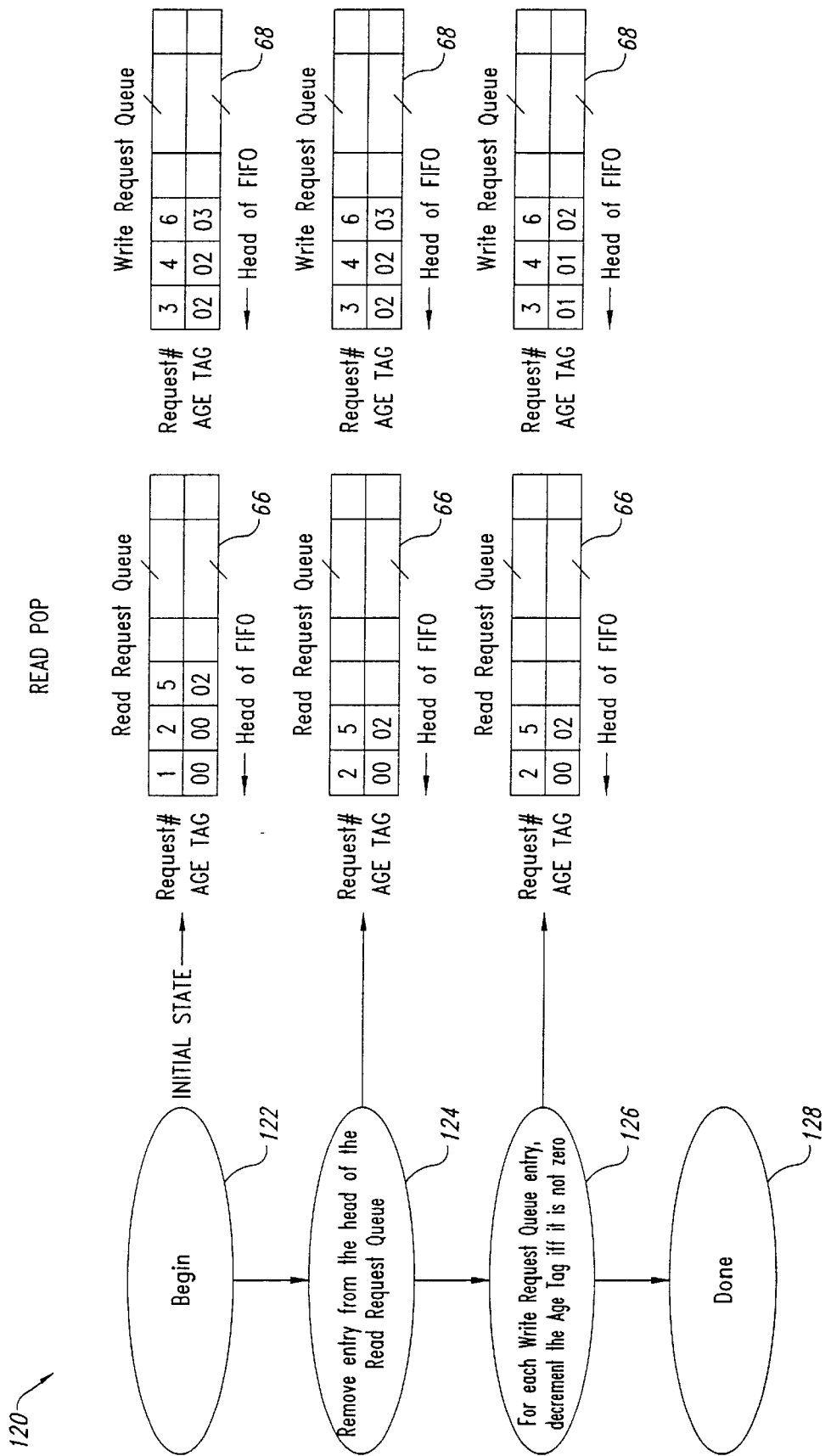

Referring to FIG. 7, a read pop operation 120 is depicted, beginning in step 122 with the initial state. In this case, the earliest received of the read requests is removed from the head of the read request queue in step 124, and the age tag value corresponding to each of the pending write requests is decremented in step 126. The read pop operation is completed in step 128.

Figure 8:
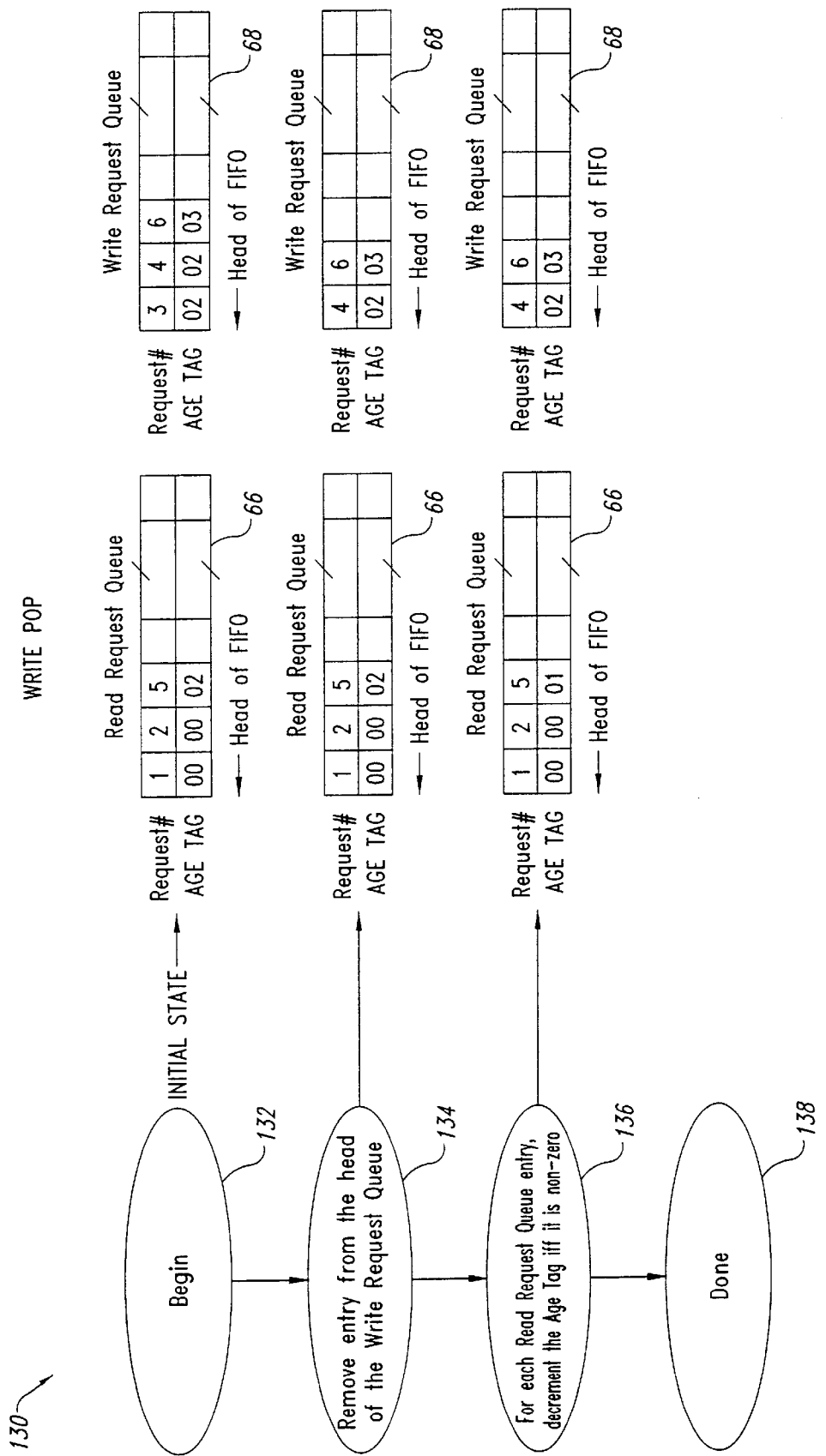

FIG. 8 depicts a write pop operation 130, beginning in step 132 with the initial state. The earliest received of the write requests is removed from the head of the write request queue in step 134, and the age tag value for each of the pending read requests is decremented in step 136. To avoid any potentially confusing negative "wrapping" of the age tag, the decrement operation is performed only on those age tag values that are non-zero. The write pop operation 130 is completed in step 138.

Figure 9:
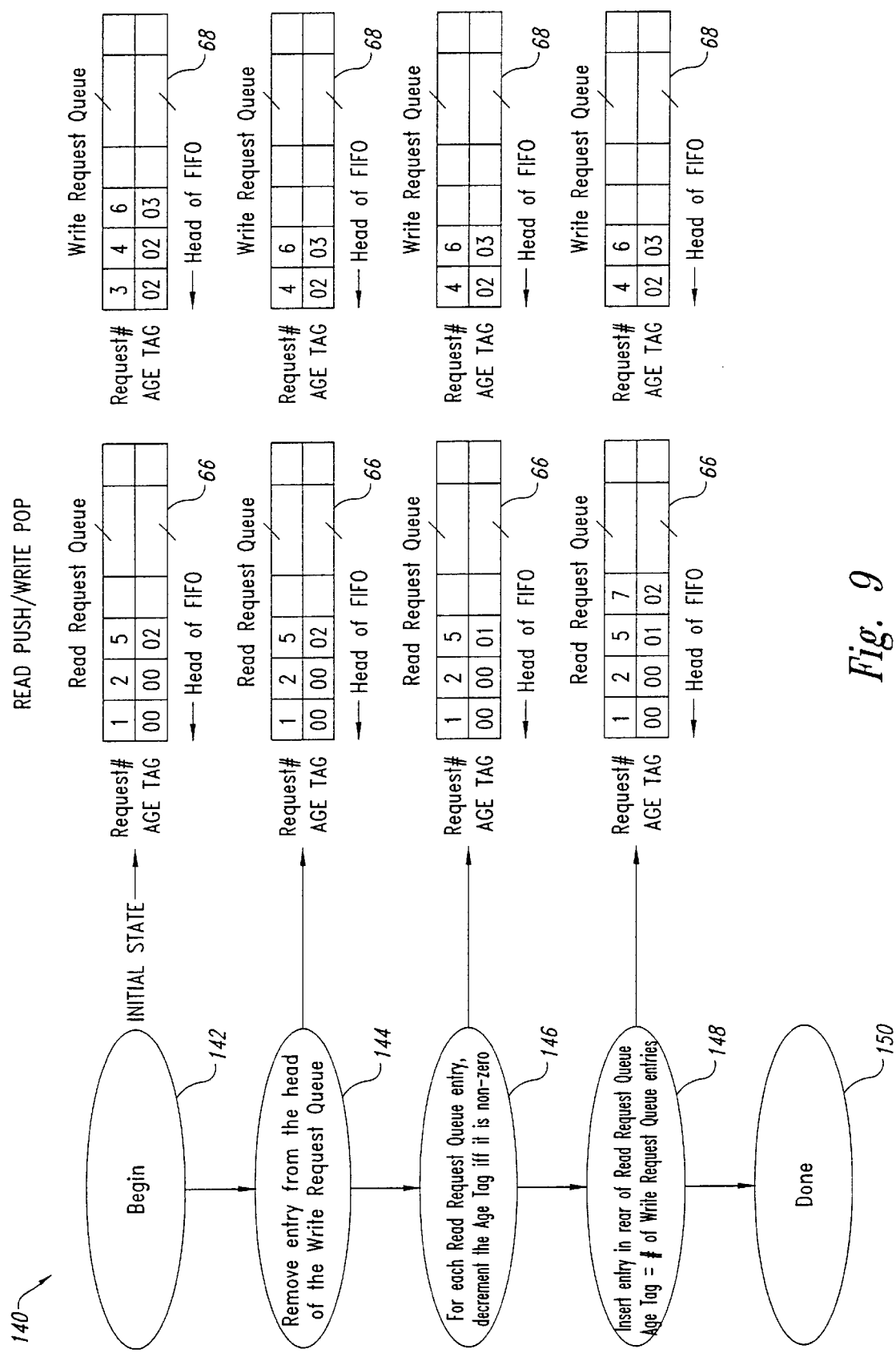

Of course, certain combinations of push and pop operations are possible. Referring to FIG. 9, a combined write pop and read push operation 140 is depicted, beginning in step 142 with the same initial state of FIGS. 5–8. The earliest received of the pending write requests is removed from the head of the write request queue in step 144, and any non-zero age tag value for each of the pending read requests is decremented in step 146. A new read request is received in step 148. It is determined that two write requests were previously received and still pending, and hence the new read request is assigned an age tag value of 2. The write pop-read push operation is then concluded at step 150. Of course, any of a wide variety of combined push and pop operations may be possible, depending upon the particular memory access pipelining implementations desired.

Those skilled in the art will appreciate a number of advantages achieved by the above-described embodiments of the present invention. By separating the write requests and read requests into separate queues, the embodiments of the present invention minimize the amount and complexity of pointer logic circuitry required by a single queue containing both read and write requests. However, because some of the inherent ordering information is lost by providing separate queues, the above-described age tag values and FIFOs for their storage conveniently and easily provide the necessary information to track pendency of the various pipelined requests. Ordering of write requests relative to one another is accomplished by the inherent ordering of the write request FIFO 64, as is ordering of the various read requests relative to one another in the read request FIFO 62. Provision of the age tag FIFOs 66 and 68 allows the request ordering circuitry 98 (see FIG. 3) to conveniently provide the relative ordering of write and read requests, without the requirement for large and potentially performance limiting pointer logic circuitry. Unlike the pointer logic circuitry of prior art implementations, the circuit requirements of the age FIFOs 66 and 68 scale linearly with the size of the request FIFOs 62 and 64.

Figure 10:
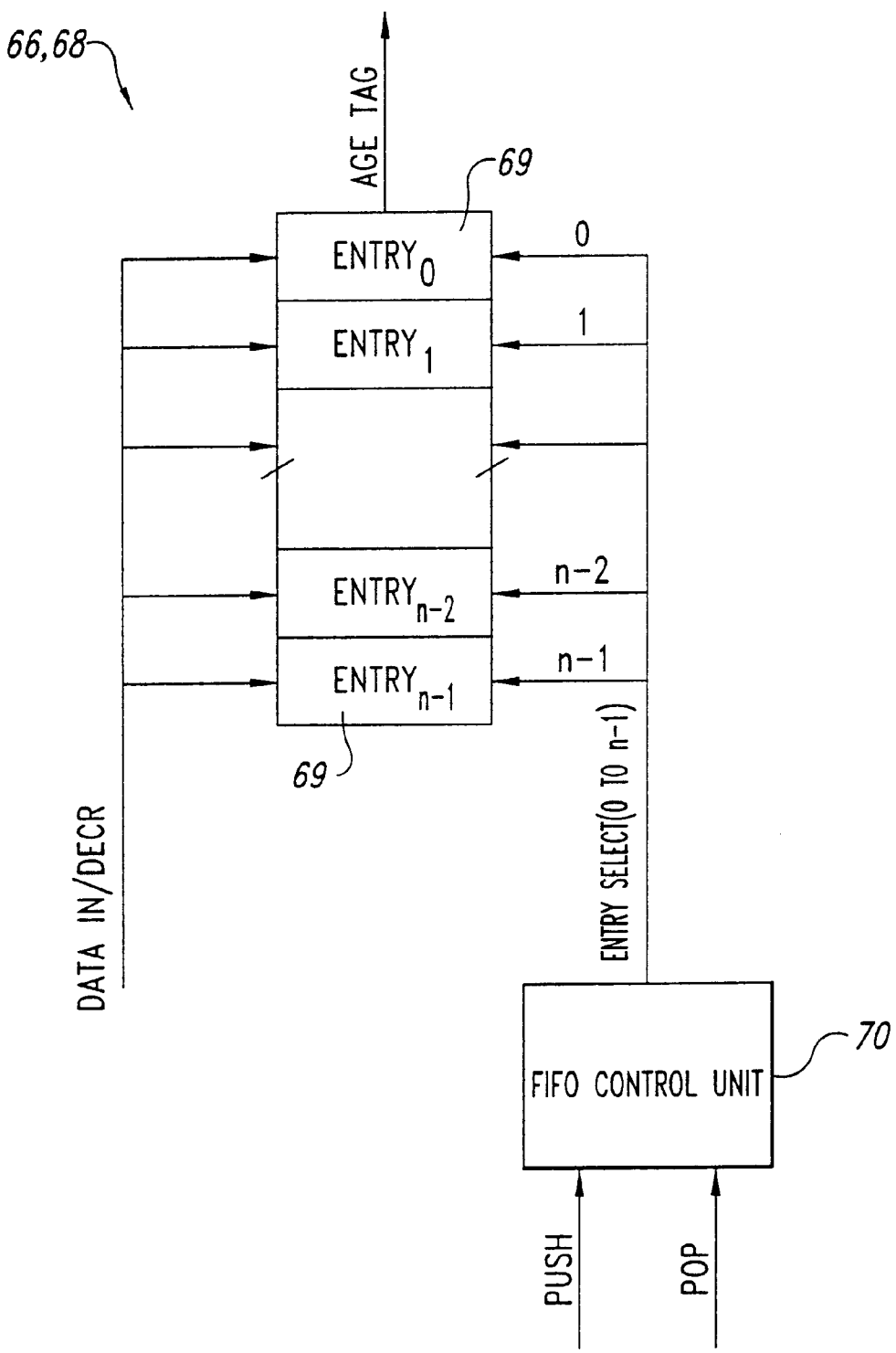
FIG. 10 is a functional block diagram depicting an age tag FIFO included in the request queue circuitry of FIG. 4.
Figure 11:
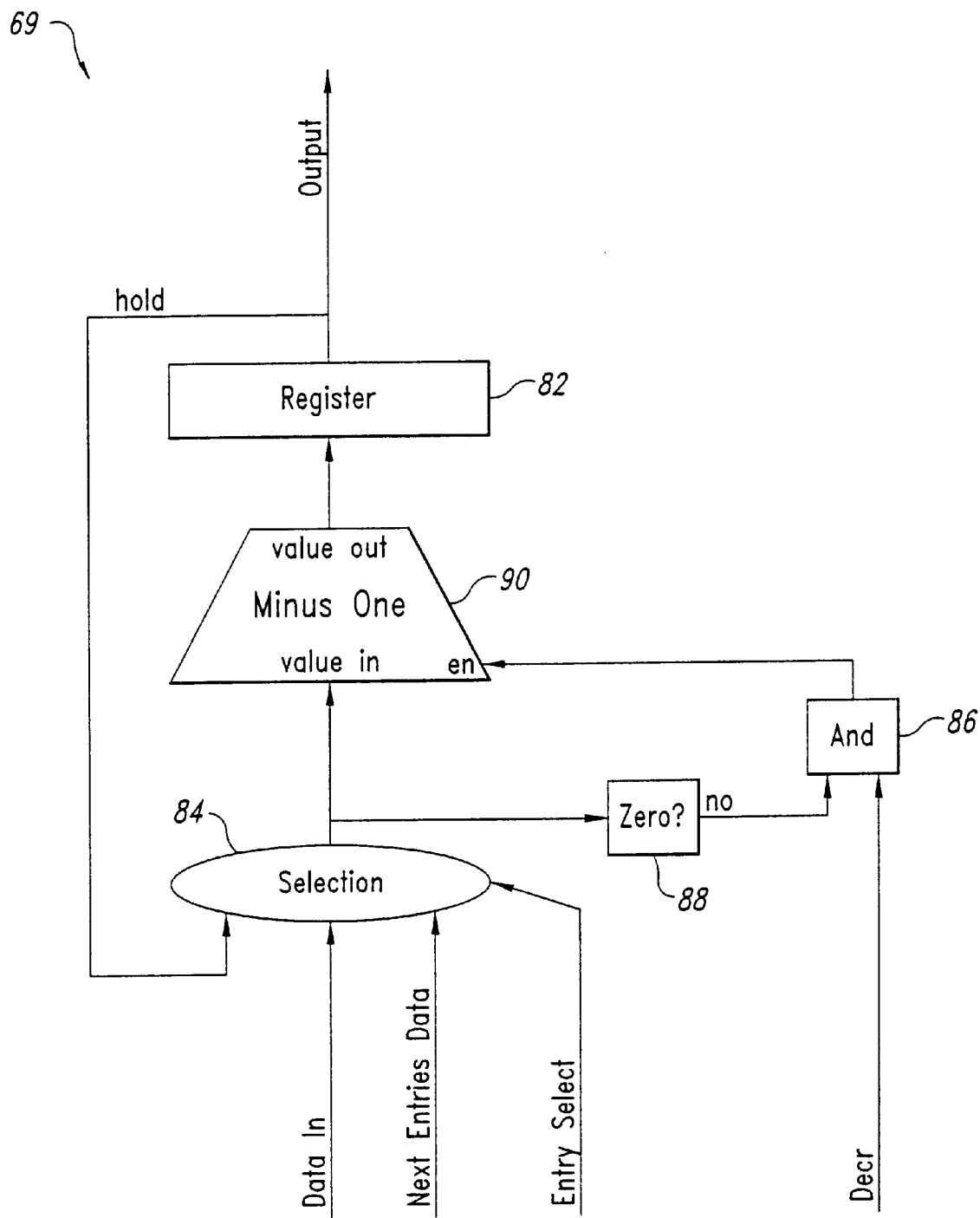
FIG. 11 is a functional block diagram depicting an individual entry circuit included in the age tag FIFO of FIG. 10.

Those skilled in the art will understand that the FIFOs depicted in FIG. 4 can be implemented in any of a number of suitable fashions. FIGS. 10 and 11 depict one possible implementation of the age FIFOs 66 and 68. Referring to FIG. 10, each of the age FIFOs 66 and 68 is depicted as having the capacity for n individual entries, numbered 0 to n−1, in entry circuits 69 for storing as many as n age tag values corresponding to as many as n received requests in the respective one of the read and write request FIFOs 62 and 64 described above. The data and decrement inputs are coupled with each of the entry circuits 69, while the push and pop control signals are applied to a FIFO control unit 70. The FIFO control unit 70 receives the push and pop signals and correspondingly produces entry select signals applied to each of the entry circuits 69. The entry select signals are used to selectively store newly received data in a next rearward empty one of the entry circuits 69, or to selectively hold the currently stored values, or to shift values from one entry to a next headward entry, as will be understood by those familiar with FIFO operation and design. The age tag values stored at the head (i.e., entry 0) of the FIFOs 66 and 68 are provided as the read and write age signals to the request ordering circuitry 98 described above.

Referring to FIG. 11, the particular details of an exemplary one of the entry circuits 69 is shown. The entry circuit 69 includes a storage circuit or register 82 for storing an age tag value, with the output of the register providing a signal corresponding to the stored age tag value. A multiplexer or selection circuit 84 is controlled by the entry select signal to select one of three signal paths to be applied to the input of the register 82. The output of the register 82 may itself be coupled through the selection circuit 84 to the register input in the event no new data is to be loaded or no data shift from one entry to another is to be effected. As appropriate, the entry select signal may cause the selection circuit 84 to apply newly loaded data to the register input or may provide the output from a next rearward of the entries via the Next Entries Data line.

In the event an asserted decrement signal is received, the decrement signal is applied to one of two terminals of an AND gate 86. The other terminal of the AND gate 86 receives a signal asserted only in the event the currently stored value in the register 82 is non-zero. This signal is produced by a zero inquiry circuit 88, which may be conveniently implemented by logically ORing the binary bits of the values stored in the register 82. The AND gate 86 outputs a signal that selectively enables a decrementor 90 coupled between the selection circuit 84 and the input of the register 82. In response to the AND gate 86 asserting the enable signal, the decrementor 90 decrements the value input into the register 82. If the enable signal is not asserted, the decrementor 90 passes the value unchanged.

Although not shown in detail in the figures, the above-described request FIFOs 62 and 64 can be implemented in accordance with any of a variety of suitable FIFO design topologies, as will be clear to those skilled in the art. For example, the request FIFOs 62 and 64 may include register and selection circuitry similar to that described above in connection with FIG. 11, along with logic circuitry to provide a status signal reflecting the number of entries stored in the request FIFOs.

Those skilled in the art will appreciate that methods in accordance with the present invention may be accomplished with circuits other than those depicted and described in connection with FIGS. 3–4 and 10–11. These figures represent just one of many possible implementations of separate pipelined read and write request queues, in which relative age information is provided to allow proper ordering of the read operations relative to the write operations. Those skilled in the art will also understand that each of the circuits whose function, method of operation, and interconnection is described in connection with FIGS. 2–4 and 10–11 is of a type known in the art. Therefore, one skilled in the art will be readily able to adapt such circuits in the described combination to practice this invention. Particular details of these circuits are not critical to the invention, and a detailed description of the internal circuit operation need not be provided. Similarly, each one of the process steps described in connection with FIGS. 5–9 is of a type well known in the art, and may itself be a sequence of operations that need not be described in detail in order for one skilled in the art to practice the present invention.

From the foregoing it will be appreciated that, although specific embodiments of the invention have been described herein for purposes of illustration, various modifications may be made without deviating from the spirit and scope of the invention. Those skilled in the art will appreciate that many of the advantages associated with the circuits for performing the processes described above may be provided by other circuit configurations performing similar processes. Indeed, a number of suitable circuit components can be adapted and combined in a variety of circuit topologies to implement various methods of controlling pipelined memory access operations in accordance with the present invention. Accordingly, the invention is not limited by the disclosed embodiments, but instead the scope of the invention is determined by the following claims.

What is claimed is:

1. A method of controlling data transfer to and from a memory, comprising:

receiving a data transfer request;

determining an age value associated with the received request; and servicing the request at a time corresponding with the age value.

2. A method according to claim 1 wherein determining the age value comprises:

if the received request is a read request, then determining the number of pending write requests; and if the received request is a write request, then determining the number of pending read requests.

3. A method according to claim 1 wherein determining the age value comprises:

if the received request is a read request, then determining the number of pending write requests;

setting the age value in correspondence with the determined number of pending write requests; and if one of the pending write requests is subsequently serviced, then modifying the age value.

4. A method according to claim 3 wherein setting the age value includes setting the age value equal to the determined number of pending write requests.

5. A method according to claim 3 wherein modifying the age value includes decrementing the age value.

6. A method according to claim 1 wherein determining the age value comprises:

if the received request is a write request, then determining the number of pending read requests;

setting the age value in correspondence with the determined number of pending read requests; and if one of the pending read requests is subsequently serviced, then modifying the age value.

7. A method according to claim 6 wherein setting the age value includes setting the age value equal to the determined number of pending read requests.

8. A method according to claim 6 wherein modifying the age value includes decrementing the age value.

9. A method according to claim 1 wherein servicing the request includes servicing the request in compliance with AGP request ordering rules.

10. A method of controlling read and write operations with a memory, comprising:

receiving a read request;

determining the number of pending write requests;

assigning a read age tag to the read request, the read age tag corresponding with the determined number of pending write requests; and servicing the read request at a time corresponding with the read age tag.

11. A method according to claim 10, further comprising modifying the read age tag when one of the pending write requests is serviced.

12. A method according to claim 10 wherein assigning the read age tag includes setting the read age tag equal to the determined number of pending write requests, and further comprising decrementing the read age tag when one of the pending write requests is serviced.

13. A method according to claim 10 wherein servicing the read request includes servicing the read request in compliance with AGP request ordering rules.

14. A method of controlling read and write operations with a memory, comprising:

receiving a write request;

determining the number of pending read requests;

assigning a write age tag to the write request, the write age tag corresponding with the determined number of pending read requests; and servicing the write request at a time corresponding with the write age tag.

15. A method according to claim 14, further comprising modifying the write age tag when one of the pending read requests is serviced.

16. A method according to claim 14 wherein assigning the write age tag includes setting the write age tag equal to the determined number of pending read requests, and further comprising decrementing the write age tag when one of the pending read requests is serviced.

17. A method according to claim 14 wherein servicing the write request includes servicing the write request in compliance with AGP request ordering rules.

18. In a computer system having a memory coupled with a system controller operable to receive and queue a plurality of memory access requests, a method of ordering service of the memory access requests, comprising:

storing the memory access requests;

for each of the memory access requests, determining an associated age tag;

storing the age tags;

servicing the memory access requests in a sequence determined by the age tags; and selectively modifying the age tags.

19. A method according to claim 18 wherein storing the memory access requests includes:

storing each of the memory access requests that is a read request in a first request queue; and storing each of the memory access requests that is a write request in a second request queue.

20. A method according to claim 19 wherein determining the age tags includes:

for each read request, determining the number of previously received write requests; and for each write request, determining the number of previously received read requests.

21. A method according to claim 19 wherein storing the age tags includes:

storing each of the age tags associated with the read requests in a first age queue; and storing each of the age tags associated with the write requests in a second age queue.

22. A method according to claim 19 wherein modifying the age tags includes:

for each read request that is serviced, decrementing the non-zero age tags associated with the write requests; and for each write request that is serviced, decrementing the non-zero age tags associated with the read requests.

23. A method according to claim 18 wherein servicing the memory access requests includes servicing the memory access requests in compliance with AGP request ordering rules.

24. In a computer system having a memory coupled with a system controller operable to receive and queue a plurality of read and write memory access requests, a method of ordering service of the requests, comprising:

storing each of the read requests in a first request queue;

storing each of the write requests in a second request queue;

for each read request, storing an associated read age tag in a first age queue;

for each write request, storing an associated write age tag in a second age queue;

servicing the requests in an order determined by the associated age tags;

for each read request that has been serviced, selectively modifying the write age tags; and for each write request that has been serviced, selectively modifying the read age tags.

25. A method according to claim 24 wherein storing an associated read age tag includes storing a value corresponding to the number of previously received write requests, and wherein storing an associated write age tag includes storing a value corresponding to the number of previously received read requests.

26. A method according to claim 24 wherein each of the first and second request queues and the first and second age queues is operated as a first-in first-out queue.

27. A method according to claim 24 wherein servicing the requests includes servicing the requests in compliance with AGP request ordering rules.

* * * * *